United States Patent
Sueto et al.

(10) Patent No.: US 8,329,282 B2
(45) Date of Patent: Dec. 11, 2012

(54) POWER TRANSMISSION BELT AND METHOD OF MANUFACTURING A POWER TRANSMISSION BELT

(75) Inventors: Yosuke Sueto, Hyogo (JP); Hideyuki Matsumoto, Hyogo (JP)

(73) Assignee: Mitsuboshi Belting Ltd. (JP)

( * ) Notice: Subject to any disclaimer, the term of this patent is extended or adjusted under 35 U.S.C. 154(b) by 793 days.

(21) Appl. No.: 12/150,436

(22) Filed: Apr. 28, 2008

(65) Prior Publication Data

US 2008/0286529 A1    Nov. 20, 2008

(30) Foreign Application Priority Data

| Apr. 26, 2007 | (JP) | ................................. 2007-116428 |
| Mar. 6, 2008 | (JP) | ................................... 2008-55845 |
| Apr. 7, 2008 | (JP) | ................................... 2008-99067 |

(51) Int. Cl.
- B32B 3/00 (2006.01)
- D02G 3/00 (2006.01)
- F16G 1/00 (2006.01)
- F16G 5/00 (2006.01)
- F16G 9/00 (2006.01)

(52) U.S. Cl. ........ 428/167; 428/156; 428/172; 428/375; 474/260

(58) Field of Classification Search ................. 428/156, 428/167, 172, 375, 395, 295.4, 296.4, 297.1, 428/296.7, 296.1; 474/260, 261, 263, 265; 442/64, 71

See application file for complete search history.

(56) References Cited

U.S. PATENT DOCUMENTS

| 3,577,393 | A | * | 5/1971 | Schrage et al. | ............... 526/283 |
| 5,891,561 | A | * | 4/1999 | Kinoshita et al. | ........... 428/295.1 |
| 6,607,828 | B1 | * | 8/2003 | Hasaka | ......................... 428/369 |
| 7,901,313 | B2 | * | 3/2011 | Shiriike | ........................ 474/260 |
| 7,909,720 | B2 | * | 3/2011 | Burrowes et al. | ............. 474/271 |
| 2003/0180516 | A1 | * | 9/2003 | Hasaka et al. | ............. 428/295.1 |
| 2009/0048049 | A1 | * | 2/2009 | Yoshida et al. | ................ 474/264 |
| 2009/0081473 | A1 | * | 3/2009 | Ohno | ............................ 428/515 |

FOREIGN PATENT DOCUMENTS

| JP | 2000-234277 | | 8/2000 |
| WO | WO 2005116482 | A1 * | 12/2005 |
| WO | WO 2006051652 | A1 * | 5/2006 |
| WO | WO 2006112386 | A1 * | 10/2006 |

* cited by examiner

Primary Examiner — Catherine A Simone
(74) Attorney, Agent, or Firm — Wood, Phillips, Katz, Clark & Mortimer (57) ABSTRACT

A power transmission belt having a body made at least in part from ethylene-α-olefin rubber. At least one load carrying member is embedded in the ethylene-α-olefin rubber. First, second and third films are formed on the load carrying member. The first film is made from at least one of an isocyanate compound and an epoxy compound, the second film from polybutadiene rubber, and the third film from an ethylene-propylene-diene terpolymer.

10 Claims, 3 Drawing Sheets

POWER TRANSMISSION BELT AND METHOD OF MANUFACTURING A POWER TRANSMISSION BELT

BACKGROUND OF THE INVENTION

1. Field of the Invention

This invention relates to power transmission belts and, more particularly, to a power transmission belt having at least one load carrying cord embedded therein. The invention is also directed to a method of manufacturing such a power transmission belt.

2. Background Art

Power transmission belts have long been used on engines in the automotive industry. Commonly, these belts have been made using natural rubber, styrene-butadiene rubber, or chloroprene rubber.

To improve energy conservation, many automobiles are being made with increasingly smaller designs. This has resulted in very compact engine compartments wherein components of the engines are placed in close proximity to each other. As a consequence, the temperature in such compact compartments is generally higher than it was in larger engine compartments in the past. When power transmission belts are operated in this higher temperature environment, rubber layers made from the above-noted compositions tend to cure. This may lead to premature belt cracking.

To avoid this cracking phenomenon, ethylene-α-olefin rubbers have been used in place of chloroprene rubber. Exemplary rubbers are ethylene-propylene rubber (EPR) and ethylene-propylene-diene rubber (EPDM), both of which exhibit excellent thermal resistance.

Ethylene-α-olefin rubber has the drawback that it does not adhere tenaciously to fibers in load carrying members, normally incorporated into such belts. Different approaches have been followed to improve adhesion between the fibers and the ethylene-α-olefin rubber.

As one example, in Japanese Unexamined Patent Publication No. 2000-234277, there is disclosed a method of treating a fiber material with a resorcinol-formaldehyde-latex liquid (resorcinol-formalin-latex liquid) after which a separate treatment liquid is applied. The treatment liquid is prepared by adding a cross linking agent to a halogenated polymer and vulcanizing for adhesion with an ethylene-α-olefin composition.

While the above treatment may adequately address the problem of adhesion, it introduces another problem. These compositions includes halogen, which generates dioxin. This raises environmental concerns.

Thus, heretofore, the industry, in using ethylene-α-olefin rubber in power transmission belts has been faced with the choices of either: a) contending with belts that may fail by reason of inadequate adhesion between the belt rubber and fibers in load carrying members; or b) creating environmental issues by reason of using halogen-containing compositions.

SUMMARY OF THE INVENTION

The invention is directed to a power transmission belt including a body with a length, a width between laterally spaced sides, an inside and an outside. The body includes a rubber in which at least one load carrying member is embedded and extends lengthwise of the body. The rubber includes ethylene-α-olefin rubber. The at least one load carrying member has an outer surface. First, second and third films are formed on the outer surface of the at least one load carrying member. The first film includes at least one of an isocyanate compound and an epoxy compound. The second film includes polybutadiene rubber. The third film includes an ethylene-propylene-diene terpolymer.

In one form, the first film is formed directly on the outer surface of the at least one load carrying member followed by the second film and then the third film.

In one form, the second and third films are each sulfur vulcanized.

In one form, the second film consists of resorcinol-formaldehyde-latex with latex consisting of at least polybutadiene.

In one form, the proportion of butadiene in a solid content of the latex is at least 50 mass %.

In one form, a molar ratio of resorcinol to formaldehyde in the resorcinol-formaldehyde-latex is 1:2 to 2:1 and a solid mass ratio of an initial condensate of resorcinol-formaldehyde to latex is 1:2 to 1:8.

In one form, the third film consists of an ethylene-propylene-diene terpolymer having a diene content of 5 to 12.5 wt. %.

In one form, the at least one load carrying member is made up of at least one of polyester fiber and aramid fiber.

In one form, the power transmission belt is a toothed belt with teeth spaced lengthwise of the body on at least one of the inside and outside of the body.

In one form, the power transmission belt is a V-ribbed belt with a plurality of laterally spaced ribs extending lengthwise of the body.

In one form, the power transmission belt is a V-belt with a V-shaped body as viewed in cross section transversely to the length of the body.

The invention is further directed to a method of manufacturing a power transmission belt. The method includes the steps of: forming a body with a length, a width between laterally spaced sides, an inside and an outside and defined at least in part by rubber consisting of ethylene-α-olefin rubber; providing at least one load carrying member; treating the at least one load carrying member with a first treatment liquid consisting of at least one of an isocyanate compound and an epoxy compound; after treating the at least one load carrying member with the first treatment liquid, treating the at least one load carrying member with a second treatment liquid consisting of prising butadiene latex; after treating the at least one load carrying member with the second treatment liquid, treating the at least one load carrying member with a third treatment liquid consisting of ising an ethylene-propylene-diene terpolymer; and embedding the at least one load carrying member in the rubber so that the at least one load carrying member extends lengthwise of the body.

In one form, the method includes the steps of sulfur vulcanizing the butadiene latex of the second treatment liquid and the ethylene-propylene-diene terpolymer of the third treatment liquid and adhering the first and second treatment liquids to each other.

In one form, the steps of sulfur vulcanizing the butadiene latex of the second treatment liquid and the ethylene-propylene-diene terpolymer of the third treatment liquid and adhering the first and second treatment liquids to each other are carried out after treating the at least one load carrying member with the third treatment liquid.

In one form, the step of treating the at least one load carrying member with a second treatment liquid involves treating the at least one load carrying member with a second treatment liquid consisting of a resorcinol-formaldehyde-latex liquid with latex that consist of at least butadiene latex.

In one form, the step of treating the at least one load carrying member with a second treatment liquid involves treating the at least one load carrying member with a second treatment liquid consisting of a resorcinol-formaldehyde-latex liquid that consists of at least butadiene latex, wherein the proportion of butadiene in a solid content of the latex is at least 50 mass %.

In one form, the step of treating the at least one load carrying member with a second treatment liquid involves treating the at least one load carrying member with a second treatment liquid consisting of a resorcinol-formaldehyde-latex liquid with latex that consists of at least butadiene latex, and wherein a molar ratio of resorcinol to formaldehyde in the resorcinol-formaldehyde-latex is 1:2 to 2:1 and a solid mass ratio of an initial condensate of resorcinol-formaldehyde to latex is 1:2 to 1:8.

In one form, the step of treating the at least one load carrying member with a third treatment liquid involves treating the at least one load carrying member with a third treatment liquid consisting of an ethylene-propylene-diene terpolymer wherein a content of diene in the ethylene-propylene-diene terpolymer is 5 to 12.5 mass %.

In one form, the step of providing at least one load carrying member involves providing at least one load carrying member that is made up of at least one of: a) polyester fiber; and b) aramid fiber.

In one form, the step of forming a body involves forming a body to define teeth spaced lengthwise of the body on at least one of the inside and outside of the body.

In one form, the step of forming a body involves forming a body to define a plurality of laterally spaced ribs extending lengthwise of the body.

In one form, the step of forming a body involves forming a body to define a "V" shape as viewed in cross section transversely to the length of the body.

DETAILED DESCRIPTION OF THE DRAWINGS

Figure 1:
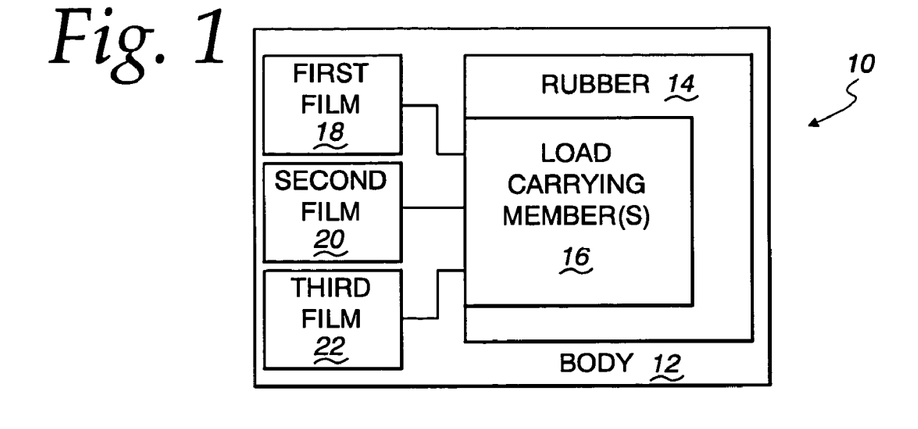
FIG. 1 is a schematic representation of a power transmission belt, made according to the present invention.

In FIG. 1, a schematic representation of a power transmission belt, according to the present invention, is shown at 10. The belt 10 has a body 12 made up at least in part of rubber 14 within which at least one load carrying member 16 is embedded and extends in a lengthwise direction. The load carrying member 16 is treated to define separate first, second and third films 18, 20, 22. The details of the components are described in detail hereinbelow. The schematic showing of FIG. 1 is intended to encompass virtually an unlimited number of different belt forms and variations of the basic power transmission belt components.

Figure 2:
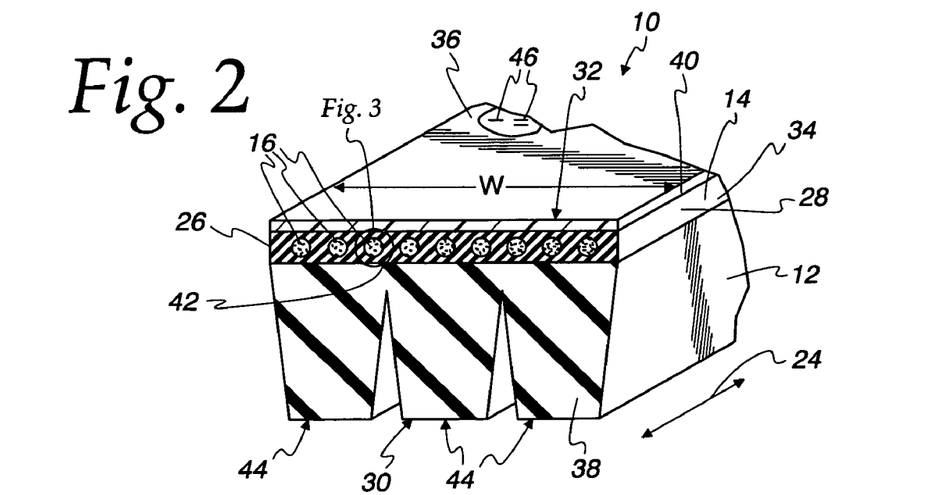
FIG. 2 is a fragmentary, cross-sectional, perspective view of a V-ribbed belt, made according to the present invention.
Figure 3:
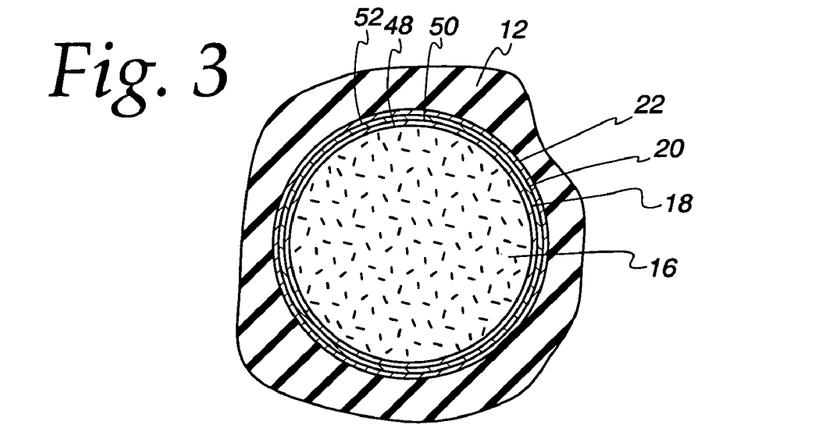
FIG. 3 is an enlarged view of the portion of the belt within the dotted circle in FIG. 2 and showing a cross section of an embedded load carrying member, treated according to the present invention.

Referring now to FIGS. 2 and 3, one specific form of the power transmission belt 10 is shown. The body 12 has a length extending in the direction of the double-headed arrow 24, a width W between laterally spaced sides 26, 28, an inside 30 and an outside 32. The designations "inside" and "outside" are arbitrary in the sense that the belt 10 can be reversed.

The rubber 14 in which the load carrying member 16 is embedded, may be formed as a single layer or multiple layers. While the entire body 12 can be made from one or any number of different rubber layers, in this embodiment, there are three rubber layers 34, 36, 38 that combine to define the body 12. The rubber layer 34 is a cushion rubber layer defined by the rubber 14. The rubber layer 36 is applied to the outside surface 40 of the cushion rubber layer 34 and is in tension during belt operation. The rubber layer 38 is applied to the inside surface 42 of the cushion rubber layer 34 and is in compression during belt operation. The layers 36, 38 will respectively be referred to hereinafter as the tension rubber layer 36 and compression rubber layer 38.

The load carrying member 16 may be considered to be one element that is spirally wrapped, or multiple elements, each defined by a turn of the spirally wrapped load carrying member 16. The turns are equidistantly laterally spaced between the sides 26, 28.

The belt 10 in FIG. 2 is a V-ribbed belt with laterally spaced ribs 44, in this embodiment three in number, extending lengthwise of the body 12. The ribs 44 have a "V" shape in cross section taken transversely to the length of the belt body 12. The ribs 44 are formed in the compression rubber layer 38 to cooperate with a complementarily-shaped pulley (not shown).

The cushion rubber layer 34 is made of a rubber composition with an ethylene-α-olefin rubber component. The ethylene-α-olefin rubber is a copolymer of ethylene and an α-olefin (propylene, butylene, hexene or octene), or a copolymer of ethylene, the above mentioned α-olefin, and non-conjugated diene. Specifically, this rubber refers to one including an ethylene-propylene rubber (EPR) or an ethylene-propylene-diene terpolymer (EPDM). The above-mentioned diene component may be a non-conjugated diene having 5 to 15 carbon atoms, such as ethylidenenorbornene, dicyclopentadiene, 1,4-hexadiene, cyclooctadiene, methylenenorbornene, or the like.

The rubber composition is preferably blended with a cross linking agent such as sulfur, organic peroxide, metal oxide, etc. The rubber composition may be blended with, as required or desired, an enhancer such as carbon black or silica, a filler such as calcium carbonate or talc, a processing aid such as fatty acid or fatty acid derivative, a plasticizer, a stabilizer, or an anti-oxidant, or the like.

The compression rubber layer 38 may be formed with the same rubber composition as that of the cushion rubber layer 34. However, formation of the compression rubber layer 38 from other compositions is also contemplated.

The tension rubber layer 36 is made from a rubber composition containing short fibers 46. By incorporating the short fibers 46, wear resistance and tear resistance may be improved. The rubber composition in the tension rubber layer 36 may be the same as used for the cushion rubber layer 34. However, other rubber compositions are contemplated.

As an alternative to using the tension rubber layer 36, a cover canvas layer (not shown), made from a fibrous material, may be substituted.

In the event that one or both of the compression rubber layer 38 and tension rubber layer 36 are made from a rubber composition different than that making up the cushion rubber layer 34, the rubber may be, for example, ethylene-α-olefin rubber by itself, or a blend of rubber prepared by mixing ethylene-α-olefin rubber with one or more types of rubbers.

The rubber to be blended with the ethylene-α-olefin rubber may be one or a combination of a butadiene rubber (BR), a styrene-butadiene rubber (SBR), an acrylonitrile-butadiene rubber (NBR), a hydrogenated nitrile rubber (HNBR), a chloroprene rubber (CR), a butyl rubber (IIR), and a natural rubber (NR).

If all of the rubber compositions defining the belt body 12 are made from ethylene-α-olefin rubber, the belt 10 is capable of exhibiting excellent thermal resistance.

The load carrying member 16 may be a cord formed by twisting a polyester fiber, such as a polyethyleneterephthalate fiber (PET fiber), a polyethylenenaphthalate fiber (PEN fiber), a polytrimethyleneterephthalate fiber (PTT fiber), or an amide fiber.

Preferably, polyester or aramid fiber is used. As the polyester contracts upon being heated, the belt tends to maintain tension adequately.

Aramid fiber has a better tensile strength than polyester fiber and generally will be expected to accommodate higher tension and load than belts using a polyester fiber. Since the aramid fiber does not contract significantly upon being heated, an auto tensioner device may be required to consistently maintain adequate belt tension.

As seen particularly in FIG. 3, the first film 18, second film 20, and third film 22 are formed on the outer surface 48 of the load carrying member 16. Preferably, the films 18, 20, 22 are applied in the order shown.

The first film 18, preferably formed directly on the outer surface 48, contains at least one of an isocyanate compound and an epoxy compound. The first film 18 is formed by dipping an untreated fiber cord into a first treatment liquid containing at least one of an epoxy compound and an isocyanate compound and thereafter drawing the cord at a high temperature. The first treatment liquid is prepared by mixing at least one of an isocyanate compound and an epoxy compound with an organic solvent such as toluene or methyl ethyl ketone.

Among suitable examples for the isocyanate compound for the first film 18 are 4,4'-diphenylmethane diisocyanate, tolylene 2,4-diisocyanate, polymethylenepolyphenyldiisocyanate, hexamethylenediisocyanate, polyarylpolyisocyanate (e.g., sold under the product name PAPI), and the like.

The isocyanate compound may be a blocked polyisocyanate in which an isocyanate group of polyisocyanate is blocked by reacting the isocyanate compound with a blocking agent such as phenols, tertiary alcohols, or secondary alcohols.

Suitable examples of the epoxy compound include: reaction products of polyhydric alcohol such as ethylene glycol, glycerin, and pentaerythritol, or polyalkylene glycol such as polyethylene glycol, with a halogen-containing epoxy compound such as epichlorhydrin; or reaction products of polyhydric phenols such as resorcin, bis(4-hydroxyphenyl)dimethylmethane, a phenol-formaldehyde resin, or a resorcin-formaldehyde resin, with a halogen-containing epoxy compound.

The second film 20 is preferably formed on the outer surface 50 of the first film 18 and contains a butadiene rubber (BR) composition. The butadiene rubber composition includes a sulfur cross-linking agent. The sulfur cross-linking agent may include a single body sulfur, colloid-shaped sulfur as a single body water dispersible type, or a sulfuric cross-linking agent such as maleimide as a water-soluble type.

The second film 20 is formed by dipping the fiber cord, having the first film 18 formed thereon, into a second treatment liquid including resorcinol-formaldehyde-latex liquid (RFL), using BR latex, and then thermally treating the fiber cord. The thermal treatment is carried out so as to vaporize a solvent in the second treatment liquid, but not to vulcanize the BR latex.

Generally, the RFL liquid is used as an adhesive between the rubber and fiber and is made by mixing an initial condensate of resorcinol with formaldehyde with rubber latex. In the second treatment liquid, BR rubber latex is used.

To achieve adequate adhesion, a molar ratio of resorcinol to formaldehyde is 1:2 to 2:1. If the molar ratio is less than ½, an excessive three-dimensioning of resorcinol-formaldehyde resin takes place, thereby producing a gel. If the molar ratio exceeds ⅔, the reaction between resorcinol and formaldehyde may not be adequately carried out, whereby adhesion may be detrimentally lowered.

A solid mass ratio of the initial condensate of resorcinol-formaldehyde to latex is preferably 1:2 to 1:8. Within this range, adhesion may be adequate. If the ratio is less than ½, the resin amount of resorcinol-formaldehyde becomes large and the RFL may become hard, so as to thereby lower dynamic adhesion. If the ratio exceeds ⅛, the resin amount for the resorcinol-formaldehyde becomes small, as a result of which the RFL film will become relatively soft, thereby potentially detrimentally lowering adhesion.

The third film 22 is preferably formed on the outer surface 52 of the second film 20. The third film 22 preferably contains an ethylene-propylene-diene terpolymer (EPDM). The content of diene in the EPDM rubber is preferably 5 to 12.5 mass %. The EPDM rubber composition of the third film 22 also preferably includes a sulfur cross-linking agent such as the BR rubber composition of the second film 20.

If the diene content of the EPDM rubber for the third film 22 is too low, the crosslinking density at the interface with the BR rubber in the second film 20 is lowered, adversely affecting adhesion between the second and third film 20, 22. If the diene content is too high, crosslinking density is too high and the region at the interface is likely to break down.

The third film 22 may include, as required, a compounding agent that may be an enhancer such as carbon black or silica, a filler such as calcium carbonate or talc, a processing aid such as fatty acid or a fatty acid derivative, a plasticizer, a stabilizer, or an antioxidant.

The third film 22 is preferably formed by dipping the cord upon which the second film 20 is formed into the third treatment liquid including unvulcanized EPDM, and then subjecting the cord to thermal treatment. The thermal treatment is carried out in a way as to vaporize a solvent in the third treatment liquid 22, but not to vulcanize the EPDM rubber. The third treatment liquid is prepared by melting an EPDM blended rubber, including EPDM as a main component in the compounding agents, as mentioned above, in an organic solvent such as toluene and methyl ethyl ketone.

Generally, since the EPDM rubber has poor wettability, it tends to repel water. However, the BR latex used in the second treatment liquid has a relatively high compatibility with the third treatment liquid, including the EPDM rubber. Thus, adhesion between the second film 20 and third film 22 is adequate. If the EPDM latex is used as the latex of the second treatment liquid, compatibility with the third treatment liquid, including the EPDM rubber, is relatively high. However, adhesion between the second film 20 and third film 22 may be compromised for reasons as explained hereinbelow.

The BR rubber included in the second film 20 and the EPDM rubber included in the third film 22 are preferably vulcanized through sulfur vulcanization and adhered to each other in a vulcanization process in forming a belt sleeve, as hereinafter described, during manufacture of the V-ribbed belt 10. That is, by cross-linking reaction due to sulfur generated at an interface between the second film 20 and third film 22, the two films 20, 22 become chemically bonded to each other. Thus, the second film 20 and third film 22 become firmly adhered to each other by vulcanization adhesion.

Through the vulcanization process, the third film 22 and rubber 14 in the cushion rubber layer 34 are also adhered to each other through vulcanization adhesion.

The sulfur cross-linking is a chemical reaction in which double bonds of rubber molecular chains are broken and the removed molecular chains and molecular chains are coupled with each other using sulfur as an agent to increase the molecular amount.

If EPDM latex is used in the second treatment liquid, its ability to dissolve with the EPDM rubber is relatively high. However, the EPDM will have a smaller amount of diene than the BR. In other words, the EPDM has a smaller number of double bonds. Since the cross-linking density at the interface between the second film 20 and third film 22 is low, adhesion between the films 20 and 22 is correspondingly low.

If BR latex is used in the second treatment liquid, since BR rubber has a larger amount of diene than EPDM does, or in other words a larger number of double bonds, a cross-linking density at the interface between the second film 20 and third film 22 increases. As a result, adhesion between the second film 20 and third film 22 is improved, as is adhesion between the load carrying member 16 and cushion rubber layer 34.

If the content of diene in the EPDM of the third treatment liquid is too small, the cross-linking density at the interface between the third film 22 and second film 20 is low and, as a result, adhesion between the second film 20 and third film 22 is lowered. In contrast, if the content of diene in the EPDM is too high, the cross-linking density between the second film 20 and third film 22 becomes too high, and adhesion at the interface may become relatively weak.

Thus, if EPDM is used in the third treatment liquid, with the diene content of 5 to 12.5 mass %, the V-ribbed belt 10 may be produced with strong adhesion between the second film 20 and third film 22.

The invention makes possible excellent adherence between the load carrying member 16 and cushion rubber layer 34 without generation of environmentally detrimental halogen components.

The invention is also directed to a method for manufacturing a belt, which will be explained with respect to the exemplary V-ribbed belt 10 in FIGS. 2 and 3.

A component defining the tension rubber layer 36 and a component defining the cushion rubber layer 34 are wound around a cylindrical molding drum. Thereafter, the load carrying member 16, defined by a fiber cord treated with the first film 18, second film 20 and third film 22, is spirally wrapped therearound. A component defining the compression rubber layer 38 is then wound to form a laminate sleeve. The laminate sleeve is then vulcanized to effect cross linking.

The crosslinked sleeve is trained around a driving roller and a driven roller and advanced in an endless path under a predetermined tension. A rotating grinding wheel is moved relative to the crosslinked sleeve to contact the same and thereby form 3 to 100 grooves on a surface of the compression rubber layer 38. After grinding, the sleeve is removed from the driving and driven rollers and placed around another set of driving and driven rollers, whereon the sleeve is cut to predetermined widths with a cutter to form individual V-ribbed belts 10.

With the above-described construction, the second and third films 20, 22 are firmly adhered to each other. Excellent adherence between the cushion rubber layer 34 made from ethylene-α-olefin rubber composition and the load carrying member 16 also results. Additionally, the resulting belt 10 does not include a halogen component that is detrimental to the environment.

Modifications to the above belt construction, contemplated by the invention, are described below. The second film 22 may include a styrene-butadiene-vinylpyridine terpolymer (VP) rubber, an NBR rubber, an HNB rubber, an EPDM rubber and the like, in addition to the BR rubber. That is, as the latex of the second treatment liquid, latex of the above-mentioned rubber may be used in addition to the BR latex. Preferably, the proportion of butadiene in solid content in the latex is at least 50 mass %. This construction contributes to excellent adherence between the load carrying member 16 and cushion rubber layer 34.

As noted above, the invention is not limited to use on a V-ribbed belt and can be practiced with any type of power transmission belt, as depicted schematically in FIG. 1. For example, the power transmission belt may be a V-belt 10', as shown in FIG. 4, a toothed belt 10", as shown in FIG. 5, or a planar belt (not shown in specific form).

Figure 4:
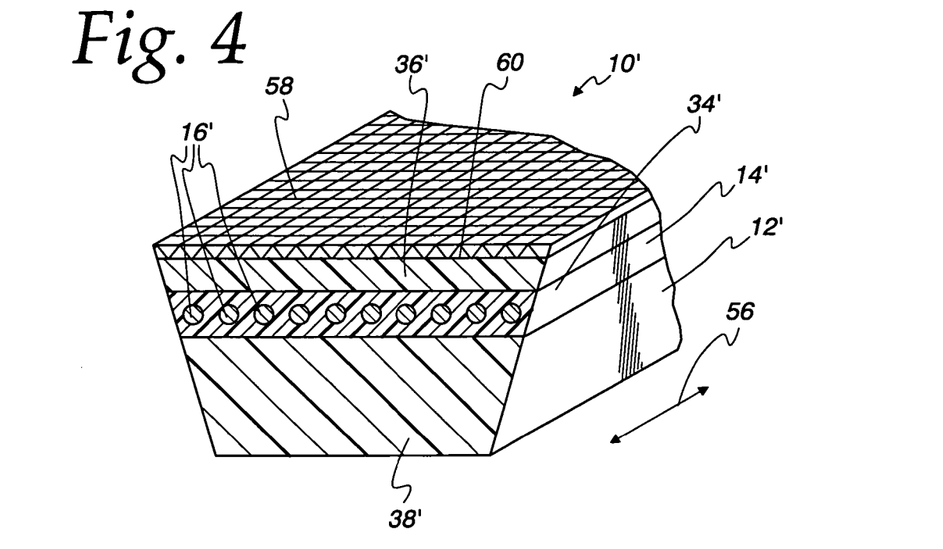
FIG. 4 is a fragmentary, cross-sectional, perspective view of a V-belt, made according to the present invention.
Figure 5:
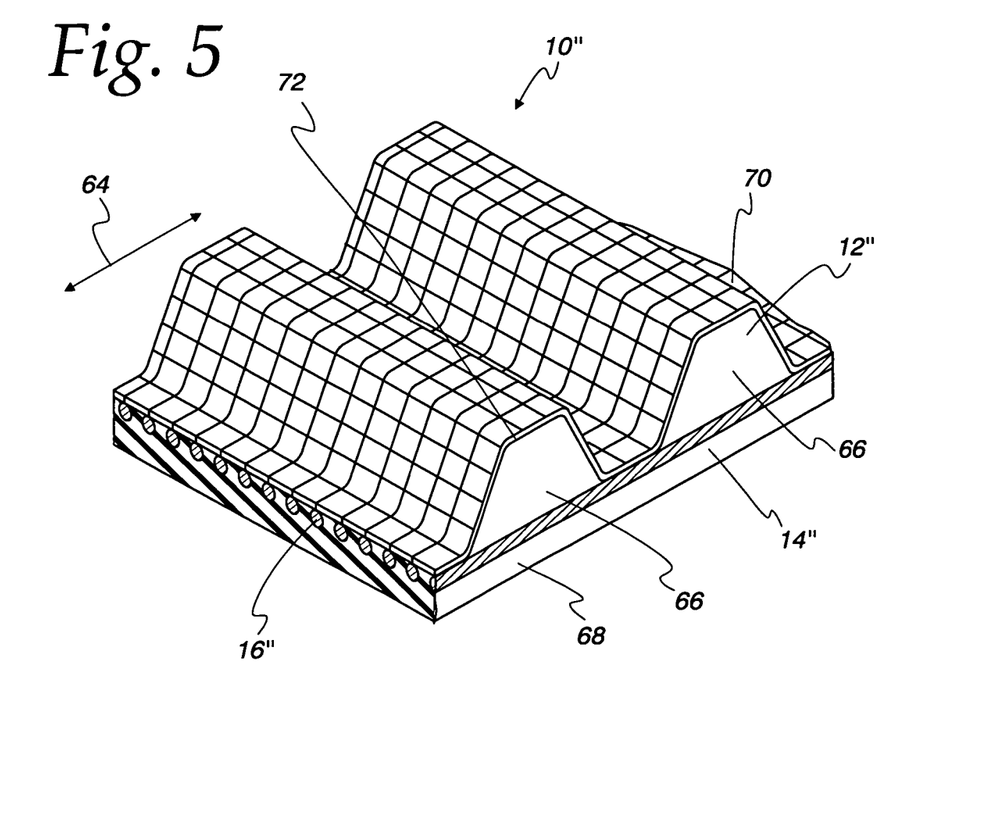
FIG. 5 is a fragmentary, cross-sectional, perspective view of a toothed belt, made according to the present invention.

The V-belt 10' in FIG. 4 is constructed so that the body 12' has the shape of the letter "V", as viewed in cross section transversely to the belt length, as indicated by the double-headed arrow 56. The body 12' of the belt 10' has a rubber composition 14' within which a load carrying member 16' is embedded to extend lengthwise of the belt body 12'. The rubber composition 14' defines a cushion rubber layer 34'. A tension rubber layer 36' is applied on the outside of the cushion rubber layer 34', with a compression rubber layer 38' applied on the inside of the cushion rubber layer 34'. A reinforced cloth layer 58 is applied on the outside surface 60 of the tension rubber layer 36'. The reinforced cloth layer 58 may, however, be omitted.

On the outer surface of the load carrying member 16', the aforementioned first film, second film and third film are formed.

The cushion rubber layer 34' may be an ethylene-α-olefin rubber composition. The tension rubber layer 36' and compression rubber layer 38' may also be made from the same rubber composition. Alternatively, it is contemplated that the tension rubber layer 36' and compression rubber layer 38' be made from compositions that are different than those from which the cushion rubber layer 34' is made.

In FIG. 5, the toothed power transmission belt 10" is shown, incorporating the present invention. The belt 10" has a body 12" with rubber 14" within which a load carrying member 16" is embedded.

The body 12" has a length in the direction of the double-headed arrow 64. Teeth 66 are arranged at regularly spaced intervals along the length of the body 12".

The rubber 14" is part of a backside layer 68 in which the load carrying member 16" is embedded. A cloth layer 70 is applied over the body surface 72. In this embodiment, the load carrying cord member 16" is treated with the first film, second film, and third film, as previously described with respect to other embodiments.

The back part layer 68 is made from an ethylene-α-olefin rubber composition. The teeth 66 may be made from the same composition. Alternatively, the teeth may be made from a different rubber composition. The cloth layer 70 is optional and may be omitted.

Figure 6:
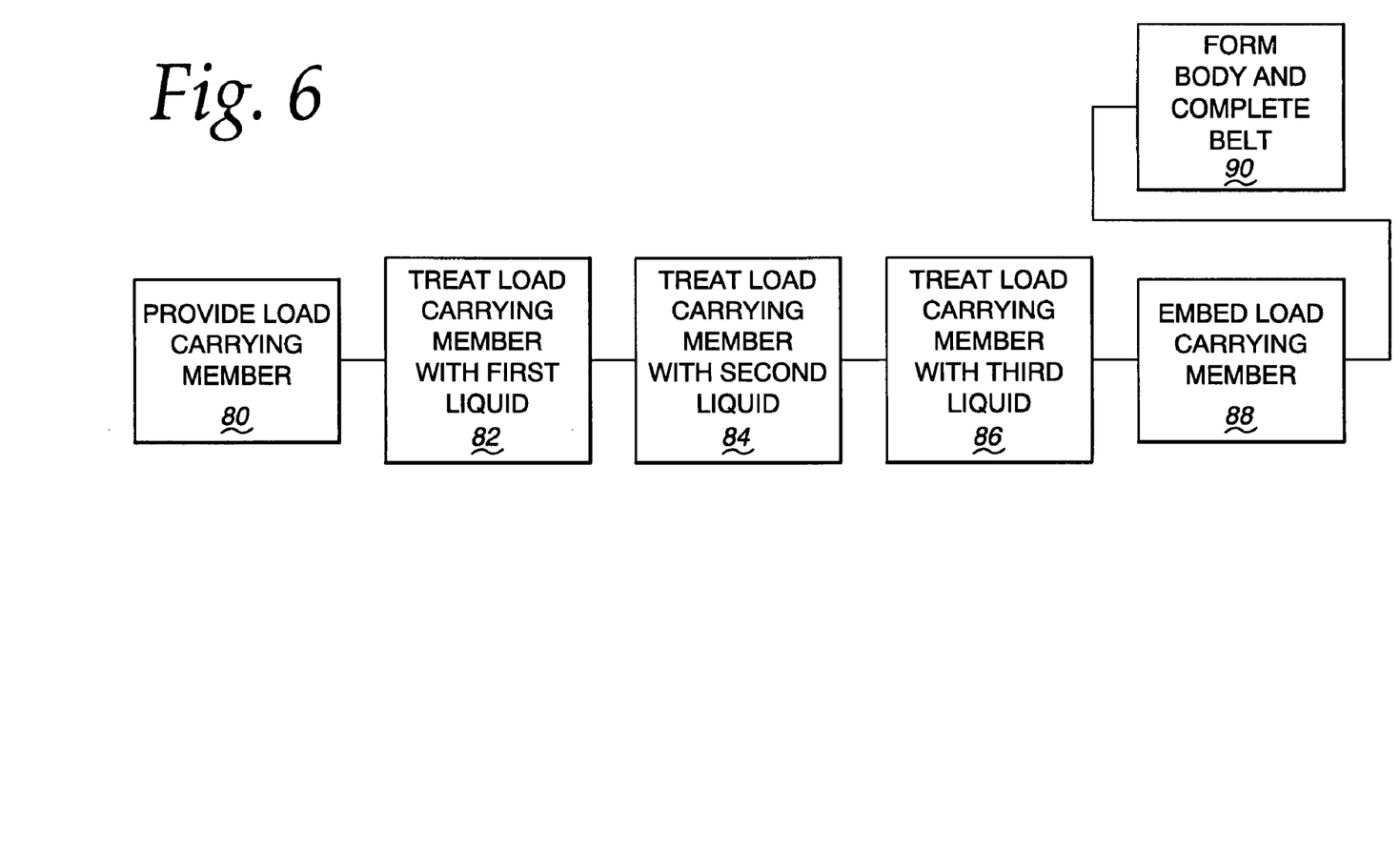
FIG. 6 is a flow diagram representation of a method of manufacturing a power transmission belt, according to the present invention.

In FIG. 6, one method of manufacturing a power transmission belt, according to the invention, is shown in flow diagram form so as to be generic in nature. As shown at block 80, at least one load carrying member is provided. As shown at block 82, the load carrying member is treated with a first treatment liquid, as described above. As shown at block 84, the load carrying member is treated with a second treatment liquid as described above. As shown at block 86, the load carrying member is treated with a third treatment liquid, as described above. As shown at block 88, the treated load carrying cord is embedded in rubber made up of ethylene-α-olefin rubber. The rubber is incorporated with other components to complete formation of the body and complete the belt formation, as indicated at block 90.

The advantages of the present invention will be demonstrated with respect to the following examples.

For Inventive Examples 1-4 and Comparative Examples 1-4, untreated fiber cords of a polyethyleneterephthalate fiber (PET fiber) of 1100 dtex/1×5 were prepared. The untreated fiber cord was dipped into a first treatment liquid, as shown in Table 1, below, obtained by mixing polymeric isocyanate with toluene, and then drying the same at 180° C. for four minutes.

TABLE 1

| Blended Chemicals | Parts by mass |
|---|---|
| polymeric isocyanate | 10 |
| toluene | 90 |
| Total | 100 |

The fiber cord was then dipped into an RFL liquid (the second treatment liquid), as shown in Table 2, after which it was heat treated at 230° C. for two minutes.

TABLE 2

| | | | Inventive Examples | | | | Comparative Examples | | | |
|---|---|---|---|---|---|---|---|---|---|---|
| | | | 1 | 2 | 3 | 4 | 1 | 2 | 3 | 4 |
| Second | R/F molar ratio | | 1/2 | 1/2 | 1/2 | 1/2 | 1/2 | 1/2 | 1/2 | 1/2 |
| Treatment | RF/L mass ratio | | 1/6 | 1/6 | 1/6 | 1/6 | 1/6 | 1/6 | 1/6 | 1/6 |
| Liquid | BR latex* (concentration of solid content 42%) | | 196 | — | 147 | 100 | — | — | — | — |
| | BR latex* (concentration of solid content 54%) | | — | 153 | — | — | — | — | — | — |
| | VP latex (concentration of solid content 40.5%) | | — | — | 51 | 100 | 203 | — | — | — |
| | NBR latex (concentration of solid content 38%) | | — | — | — | — | — | 217 | — | — |
| | CR latex (concentration of solid content 60%) | | — | — | — | — | — | — | 137 | — |
| | EPDM latex (concentration of solid content 40%) | | — | — | — | — | — | — | — | 206 |
| | resorcinol | | 11 | | | | | | | |
| | 37% formalin | | 17.8 | | | | | | | |
| | Sodium hydroxide | | 0.3 | | | | | | | |
| | Water | | 275 | 318 | 273 | 271 | 267 | 254 | 334 | 265 |
| | Total | | 500 | 500 | 500 | 500 | 500 | 500 | 500 | 500 |
| Vulcanization adhesion (N/25 mm) Sample A | | | 430 | 415 | 405 | 370 | 300 | 315 | 305 | 360 |
| Vulcanization adhesion (N/25 mm) Sample B | | | 405 | 400 | 370 | 315 | 180 | 195 | 190 | 280 |
| load carrying member adhesion (N) | | | 46 | 42 | 41 | 36 | 22 | 24 | 24 | 29 |

*Butadiene latex manufactured by ZEON Corporation, Japan

In Inventive Examples 1-4 and Comparative Examples 1-4, a molar ratio of resorcinol to formaldehyde (R/F molar ratio) and a solid mass ratio of an initial condensate of resorcinol-formaldehyde to latex in the second treatment liquid were ½ and ⅙, respectively. BR latex with different solid content concentration were used in the second treatment liquids in Inventive Examples 1 and 2, respectively. BR latex and styrene-butadiene vinylpyridine terpolymer (VP) latex were used together in the second treatment liquid with Inventive Examples 3 and 4. A mass ratio of BR latex to VP latex was 3:1 for Inventive Example 3, and 1:1 for Inventive Example 4.

Next, the fiber cord was dipped into a third treatment liquid, as shown in Table 3, obtained by dissolving EPDM blended rubber, as in Table 4, with toluene and then subjecting the same to thermal treatment for four minutes at 150° C.

As in Table 4, the content of diene in EPDM in Table 3 was 12.5 mass %.

TABLE 3

| Blended Chemicals | Parts by mass |
|---|---|
| EPDM blended rubber | 93 |
| polymeric isocyanate | 7 |
| toluene | 900 |
| Total | 1000 |

TABLE 4

| Blended Chemicals | Parts by Mass |
|---|---|
| EPDM polymer (content of diene: 12.5 mass %) | 100 |
| stearic acid | 5 |
| zinc oxide | 5 |
| carbon black | 10 |
| hydrous silica | 15 |
| resorcin-formalin copolymer | 2 |
| antioxidant | 2 |
| crosslinking promoter | 2 |
| hexamethoxymethylol melamine | 2 |
| sulfur | 1 |
| Total | 144 |

The adhesion between the treated fiber cord and EPDM rubber was measured. The treated fiber cord, with a width of 25 mm was: aligned on an un-crosslinked EPDM blended rubber, as in Table 5, below; pressed with a pressing plate; and vulcanized under two different conditions to prepare two different samples (A and B) for de-bonding tests.

TABLE 5

| Blended chemicals | Parts by Mass |
|---|---|
| EPDM polymer (content of diene: 5 mass %) | 100 |
| stearic acid | 4 |
| zinc oxide | 5 |
| carbon black | 35 |
| hydrous silica | 20 |
| resorcin-formalin copolymer | 2 |
| antioxidant | 2 |
| crosslinking promoter | 2 |
| hexamethoxymethylol melamine | 2 |
| sulfur | 1 |
| Total | 173 |

Sample A was vulcanized for 30 minutes at 160° C., with Sample B vulcanized for 60 minutes at 180° so as to be over-vulcanized. A T-type de-bonding test was performed with respect to Samples A and B according to JISK 6256 to measure adhesion (vulcanization adhesion) between the fiber cord and the rubber under room temperature conditions. The results are shown in Table 2, above.

A V-ribbed belt of EPDM rubber composition, with a treated fiber cord as a load carrying member, was prepared to measure the adhesion between the load carrying member and the EPDM rubber composition.

The V-ribbed belt was made in a conventional manner. More specifically, a tension rubber layer was wound around a cylindrical molding drum. A rubber sheet, defining the cushion rubber layer, was wrapped therearound. Load carrying members were in turn wrapped. A rubber sheet, defining the compression rubber layer, was applied, and the resulting sleeve subjected to cross linking. Ribs were formed in the compression rubber layer of the crosslinked sleeve using a grinding wheel. The sleeve was then cut to predetermined widths to form individual belts.

The cushion rubber layer was made from an EPDM rubber composition. The resulting V-ribbed belt had a width of 10.7 mm. The width was made so that 10 load carrying members/turns were embedded in the cushion rubber layer, with equal lateral spacing, to extend in a longitudinal direction.

The V-ribbed belt was cut in a width direction so that the load carrying members were exposed by removing a predetermined length of the cushion rubber layer from the outer surface of the load carrying members at the cut end portion. Two central load carrying members/turns were raised in a vertical direction to measure the de-bonding force (load carrying member adhesion) necessary to delaminate the load carrying members under room temperature conditions. The results are shown in Table 2.

It can be seen from the results in Table 2 that in any of the Comparative Examples 1-3, in which VP, NBR and CR were used as the latex of the second treatment liquid, respectively, vulcanization adhesion and load carrying member adhesion were low. Also, the adhesion to an EPDM rubber composition was poor.

In Comparative Example 4, for which EPDM was used as the latex, vulcanization adhesion of Sample A was relatively high, but vulcanization adhesion of Sample B (over-vulcanized) was low. Also, the cord adhesion was low.

With Inventive Examples 1 and 2, which used BR latex, it was found that the vulcanization adhesion, as well as cord adhesion, were high. Excellent adhesion to an EPDM rubber composition was also seen.

From the results seen with respect to Inventive Examples 3 and 4, it was determined that when BR latex and VP latex are used in combination and the proportion of BR latex is equal to or higher than that of VP latex, excellent adhesion resulted.

With Inventive Examples 5-7 and Comparative Examples 5 and 6, fiber cords were treated in the same way as for Inventive Example 1, as it was manufactured, except that the content of diene in the EPDM polymer of the third treatment liquid was different. The content of diene in Inventive Examples 5-7 and Comparative Examples 5 and 6 were as shown in Table 6. The experiment, which is the same as that for Inventive Example 1, was performed with the treated fiber cord. The results are shown in Table 6, below.

TABLE 6

|  | Inventive Examples | | | Comparative Examples | |
| --- | --- | --- | --- | --- | --- |
|  | 5 | 6 | 7 | 5 | 6 |
| Third treatment liquid Content of diene in EPDM (mass %) | 5 | 9.5 | 12.5 | 2 | 4 |
| Vulcanization adhesion (N/25 mm) Sample A | 430 | 440 | 455 | 290 | 370 |
| Vulcanization adhesion (N/25 mm) Sample B | 405 | 410 | 420 | 230 | 290 |
| load carrying member adhesion (N) | 46 | 46 | 47 | 21 | 28 |

It can be seen that Comparative Example 6, with a diene content of 4%, had clearly lower vulcanization adhesion and cord adhesion than Inventive Example 5, which had a diene content of 5%. It was also found that Inventive Examples 5-7, having a diene content of 5% and more, provided good vulcanization adhesion and cord adhesion. There was no significant difference in adhesion between Inventive Examples 5-7 because cracks were formed in the rubber in the cushion rubber layer in the vicinity of the fiber cords.

In Inventive Examples 8-12 and Comparative Examples 7-9, fiber cords were treated in the same way as for Inventive Example 1, using the same manufacturing process, except that the R/F molar ratio RF/L mass ratio of the second treatment liquids were different. The R/F molar ratio and RF/L mass ratio are shown in Table 7, below.

TABLE 7

|  |  | Inventive Examples | | | | | Comparative Examples | | |
| --- | --- | --- | --- | --- | --- | --- | --- | --- | --- |
|  |  | 8 | 9 | 10 | 11 | 12 | 7 | 8 | 9 |
| Second treatment liquid | R/F molar ratio | 1/2 | 1/1 | 2/1 | 1/2 | 1/2 | 1/3 | 3/1 | 1/2 |
|  | RF/L mass ratio | 1/6 | 1/6 | 1/6 | 1/2 | 1/8 | 1/6 | 1/6 | 1/10 |
|  | BR latex* | 196 | 204 | 208 | 196 | 196 | 188 | 209 | 196 |
|  | resorcin | | | | 11 | | | | |
|  | 37% formalin | 17.8 | 8.6 | 4.5 | 17.8 | 17.8 | 26.8 | 3 | 17.8 |
|  | Sodium hydroxide | | | | | 0.3 | | | |
|  | water | 275 | 276 | 276 | 275 | 275 | 274 | 276 | 275 |
|  | Total | 500 | 500 | 500 | 500 | 500 | 500 | 500 | 500 |
| Vulcanization adhesion (N/25 mm) Sample A | | 430 | 420 | 390 | 435 | 370 | — | 280 | 320 |
| Vulcanization adhesion (N/25 mm) Sample B | | 405 | 400 | 360 | 410 | 315 | 0 | 210 | 260 |
| load carrying members adhesion (N) | | 46 | 43 | 38 | 45 | 33 | — | 19 | 27 |

*Butadiene latex manufactured by ZEON Corporation, Japan

The experiment, the same as for Inventive Example 1, was performed with the treated fiber cords. The results are shown in Table 7.

With Comparative Example 7, with an R/F molar ratio of 1/3, the RFL second treatment liquid was formed into a gel and adhesion treatment was not possible. As compared to the condition wherein the RF/L mass ratios were equal, it was determined that Comparative Example 8, with an R/L molar ratio of 3/1, had clearly lower vulcanization adhesion and cord adhesion than Inventive Example 10, having an R/F molar ratio of 2/1.

It was also found that Inventive Examples 8-10, having an R/F molar ratio of 1/2 to 2/1, had good adhesive properties.

As demonstrated through the results with respect to Inventive Examples 8, 11 and 12, and Comparative Example 9, which have the same R/F molar ratio, if the RF/L mass ratio changes from 1/2 to 1/8, vulcanization adhesion and cord adhesion are high.

In Inventive Example 13, a fiber cord was treated the same way as for Inventive Example 1, using the same manufacturing process and a fiber cord of aramid fiber of 1670 dtex/1×2, instead of using a fiber cord of PET fiber. That is, Inventive Example 13 used the same BR latex as that for Inventive Example 1, as the latex of the second treatment liquid.

In Comparative Example 10, a fiber cord was treated in the same way as for Inventive Example 13, with the same manufacturing method, except that NBR latex was used as the latex for the second treatment liquid. As for Inventive Example 1, samples were manufactured by using the treated fiber cords of Inventive Example 13 and that of Comparative Example 10 to measure vulcanization adhesion. The results are shown in Table 8, below.

TABLE 8

|  | Inventive Example 13 | Comparative Example 10 |
| --- | --- | --- |
| Fiber cord | Aramid fiber | Aramid fiber |
| Second treatment latex | BR latex | NBR latex |
| Vulcanization adhesion (N/25 mm) Sample A | 430 | 290 |

As seen from the results in Table 8, vulcanization adhesion for Comparative Example 10, using NBR latex in the second treatment liquid, was considerably low. Vulcanization adhesion for Inventive Example 13, using BR latex, was as high as that of Sample A in Inventive Example 1, as seen in Table 2.

The foregoing disclosure of specific embodiments is intended to be illustrative of the broad concepts comprehended by the invention.

The invention claimed is:
1. A power transmission belt comprising:
a body with a length, a width between laterally spaced sides, an inside and an outside,
the body comprising rubber in which at least one load carrying member is embedded and extends lengthwise of the body,
the rubber comprising ethylene-α-olefin rubber, the at least one load carrying member having an outer surface; and first, second and third films formed on the outer surface of the at least one load carrying member, the first film comprising at least one of an isocyanate compound and an epoxy compound, the second film comprising resorcinol-formaldehyde-latex with latex comprising at least polybutadiene, the third film comprising an ethylene-propylene-diene terpolymer, wherein the third film comprises an ethylene-propylene-diene terpolymer having a diene content of 5 to 12.5 wt %, wherein said films enhance adherence of the rubber and the at least one load carrying member to each other, and wherein said second film and said third film do not comprise halogen-containing compositions.

2. The power transmission belt according to claim 1 wherein the first film is formed directly on the outer surface of the at least one load carrying member followed by the second film and then the third film.

3. The power transmission belt according to claim 2 wherein the second and third films are each sulfur vulcanized.

4. The power transmission belt according to claim 1 wherein a proportion of butadiene in a solid content of the latex is at least 50 mass %.

5. The power transmission belt according to claim 4 wherein a molar ratio of resorcinol to formaldehyde in the resorcinol-formaldehyde-latex is 1:2 to 2:1 and a solid mass ratio of an initial condensate of resorcinol-formaldehyde to latex is 1:2 to 1:8.

6. The power transmission belt according to claim 2 wherein the at least one load carrying member comprises at least one of polyester fiber and aramid fiber.

7. The power transmission belt according to claim 2 wherein the power transmission belt is a toothed belt with teeth spaced lengthwise of the body on at least one of the inside and outside of the body.

8. The power transmission belt according to claim 2 wherein the power transmission belt is a V-ribbed belt with a plurality of laterally spaced ribs extending lengthwise of the body.

9. The power transmission belt according to claim 2 wherein the power transmission belt is a V-belt with a V-shaped body as viewed in cross section transversely to the length of the body.

10. A power transmission belt comprising:

a body with a length, a width between laterally spaced sides, an inside and an outside, the body comprising rubber in which at least one load carrying member is embedded and extends lengthwise of the body, the rubber comprising ethylene-α-olefin rubber, the at least one load carrying member having an outer surface; and first, second and third films formed on the outer surface of the at least one load carrying member, the first film comprising at least one of an isocyanate compound and an epoxy compound, the second film comprising polybutadiene rubber, the third film comprising an ethylene-propylene-diene terpolymer, wherein the first film is formed directly on the outer surface of the at least one load carrying member followed by the second film and then the third film;

wherein the second film comprises resorcinol-formaldehyde-latex with latex comprising at least polybutadiene, wherein a proportion of butadiene in a solid content of the latex is at least 50 mass %, wherein the third film comprises an ethylene-propylene-diene terpolymer having a diene content of 5 to 12.5 wt. %, wherein said films enhance adherence of the rubber and the at least one load carrying member to each other, and wherein said second film and said third film do not comprise halogen-containing compositions.

* * * * *